(12) United States Patent
Takemoto

(10) Patent No.: US 11,200,706 B2
(45) Date of Patent: Dec. 14, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kazuki Takemoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 178 days.

(21) Appl. No.: 16/571,489

(22) Filed: Sep. 16, 2019

(65) Prior Publication Data
US 2020/0098149 A1 Mar. 26, 2020

(30) Foreign Application Priority Data

Sep. 21, 2018 (JP) .............................. JP2018-178083

(51) Int. Cl.
*G06T 11/00* (2006.01)
*G06T 7/90* (2017.01)

(52) U.S. Cl.
CPC .............. *G06T 11/001* (2013.01); *G06T 7/90* (2017.01)

(58) Field of Classification Search
CPC ................... G06T 11/001; G06T 7/90; G06T 2207/10024; G06T 2207/30196; G06T 7/194; G06T 7/11
See application file for complete search history.

(56) References Cited

U.S. PATENT DOCUMENTS

| 5,659,490 A | * | 8/1997 | Imamura ............... G06T 11/001 345/589 |
| 9,679,415 B2 | | 6/2017 | Takemoto |
| 2017/0026552 A1 | * | 1/2017 | Tomono ............. G06K 9/00221 |

FOREIGN PATENT DOCUMENTS

| JP | 2005107967 A | 4/2005 |
| JP | 2005228140 A | 8/2005 |
| JP | 2015230695 A | 12/2015 |

* cited by examiner

*Primary Examiner* — Phuoc Tran
(74) *Attorney, Agent, or Firm* — Rossi, Kimms & McDowell LLP

(57) ABSTRACT

There is provided with an image processing apparatus for extracting an object region from an image. An image acquisition unit acquires an image. A designation acquisition unit acquires designation of one or more extraction colors that belong to the object region of the image and designation of one or more non-extraction colors that do not belong to the object region of the image. A derivation unit derives a color conversion parameter, based on the extraction color and the non-extraction color. A conversion unit converts a color of the image based on the color conversion parameter. An extraction unit extracts the object region from the image, based on the image and the extraction color after the conversion.

18 Claims, 6 Drawing Sheets

| Y, Cb, Cr | COUNT |
|---|---|
| 12, 56, 36 | 6 |
| 13, 56, 36 | 8 |
| 23, 63, 37 | 6 |
| 25, 23, 27 | 3 |

| Y, Cb, Cr | COUNT |
|---|---|
| 12, 56, 36 | 14 |
| 13, 56, 36 | 4 |
| 23, 63, 37 | 8 |
| 29, 26, 17 | 1 |

| Cb', Cr' | COUNT | STATE |
|---|---|---|
| 24, 26 | 14 | UNEXTRACTED |
| 36, 53 | 20 | REGISTERED |
| 83, 78 | 12 | UNEXTRACTED |
| 120, 10 | 5 | REGISTERED |

| Cb', Cr' | COUNT | STATE |
|---|---|---|
| 24, 26 | 18 | NOT REGISTERED |
| 36, 53 | 18 | OVEREXTRACTION |
| 83, 78 | 20 | NOT REGISTERED |
| 155, 54 | 7 | NOT REGISTERED |

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method and a storage medium, and, as a specific example, relates to a technology for extracting an object from an image.

Description of the Related Art

Heretofore, technologies for separating the foreground and background of an image are known. For example, when the foreground region of an image is extracted, various types of processing can be performed using the extraction result. One application example is the mixed reality field in which information of a virtual space is overlaid on a real space in real time and presented to a user. In order to realize a rich presence experience in this field, it is sought to realize interaction that involves the person having the experience touching and manipulating virtual objects that are rendered by computer graphics. For this reason, it is sought to be able to display an object (a hand of a user within the image, etc.) for manipulating a virtual object in front (foreground) of the virtual object, rather than merely displaying computer graphics in an overlaid manner on a camera image of the real space. According to such a configuration, a sense of reality and a sense of distance from the virtual object can be maintained, and the sense of presence can be enhanced. On the other hand, in order to realize such an interaction, it is necessary to determine an object region within the camera image.

In order to solve this problem, Japanese Patent Laid-Open No. 2005-107967 proposes a technology that determines the object region within a camera image, using color information of an object registered in advance. Also, Japanese Patent Laid-Open No. 2005-228140 discloses a user interface that facilitates registration and deletion of color information of an object. Furthermore, Japanese Patent Laid-Open No. 2015-230695 discloses a user interface for facilitating registration of color information of an object, and proposes a technology that determines an object region within a camera image, such that the object region excludes pixels having color information of a registered background.

SUMMARY OF THE INVENTION

According to an embodiment of the present invention, an image processing apparatus for extracting an object region from an image, comprising: an image acquisition unit configured to acquire an image; a designation acquisition unit configured to acquire designation of one or more extraction colors that belong to the object region of the image and designation of one or more non-extraction colors that do not belong to the object region of the image; a derivation unit configured to derive a color conversion parameter, based on the extraction color and the non-extraction color; a conversion unit configured to convert a color of the image based on the color conversion parameter; and an extraction unit configured to extract the object region from the image, based on the image and the extraction color after the conversion.

According to another embodiment of the present invention, an image processing apparatus for extracting an object region from an image, comprises: an image acquisition unit configured to acquire an image in which each pixel is represented by color information of three dimensions or more including a first color value representing brightness and a second color value representing chromaticity; a designation acquisition unit configured to acquire designation of an extraction color belonging to the object region of the image; a conversion unit configured to lower the dimension of the color information of the image, and to derive color information after conversion using both the first color value and the second color value; and an extraction unit configured to extract the object region from the image, based on the image and the extraction color after the conversion.

According to still another embodiment of the present invention, an image processing apparatus for extracting an object region from an image, comprises: an image acquisition unit configured to acquire an image; a designation acquisition unit configured to acquire designation of one or more extraction colors that belong to the object region of the image and designation of one or more non-extraction colors that do not belong to the object region of the image; and an extraction unit configured to extract the object region from the image, such that a region within the extracted object region which does not have the non-extraction color changes according to designation of the non-extraction color.

According to yet another embodiment of the present invention, an image processing method for extracting an object region from an image, comprises: acquiring an image; acquiring designation of one or more extraction colors that belong to the object region of the image; acquiring designation of one or more non-extraction colors that do not belong to the object region of the image; deriving a color conversion parameter, based on the extraction color and the non-extraction color; converting a color of the image based on the color conversion parameter; and extracting the object region from the image, based on the image and the extraction color after the conversion.

According to still yet another embodiment of the present invention, a non-transitory computer-readable medium stores a program which, when executed by a computer comprising a processor and a memory, causes the computer to perform: acquiring an image; acquiring designation of one or more extraction colors that belong to the object region of the image; acquiring designation of one or more non-extraction colors that do not belong to the object region of the image; deriving a color conversion parameter, based on the extraction color and the non-extraction color; converting a color of the image based on the color conversion parameter; and extracting the object region from the image, based on the image and the extraction color after the conversion.

Further features of the present invention will become apparent from the following description of exemplary embodiments (with reference to the attached drawings).

DESCRIPTION OF THE EMBODIMENTS

Even when the techniques of Japanese Patent Laid-Open Nos 2005-107967, 2005-228140, and 2015-230695 were used, extraction noise tended to occur, particularly in the case where the color of the object and the color of the background were similar. For example, there were times when a portion of an object was not extracted as the object region (i.e., unextracted), or when a portion that was not the object was extracted as the object region (i.e., overextracted). Extraction noise also tended to readily occur in white regions and black regions (almost achromatic regions) of the background. In this case, although it is desired to reduce extraction noise through further registration of color information, it took time for the user to repeatedly register color information in order to obtain a favorable object extraction result.

One embodiment of the present invention improves the accuracy of object extraction from an image.

Hereinafter, an embodiment of the present invention will be described based on the drawings. The scope of the present invention is, however, not limited to the following embodiment.

Summary of Object Extraction Processing

Figure 5A:
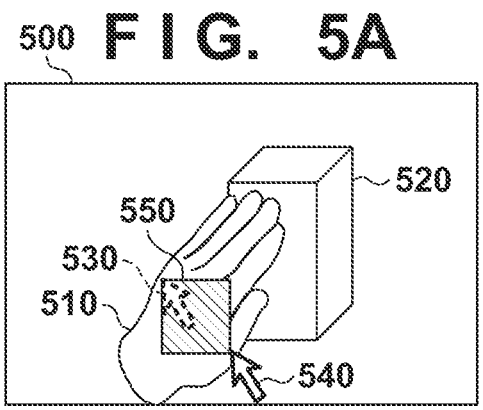
FIGS. 5A to 5J illustrate object extraction processing.

First, an outline of object extraction processing will be given with reference to FIGS. 5A to 5J. Hereinafter, description will be given taking the case where an object is extracted from a still image as an example for simplification of description. In this specification, "object" refers to an object to be extracted from an image, and "background" refers to portions other than the object. FIG. 5A shows a camera image 500 that is targeted for processing. A hand 510, which is the object, and a yellow box 520 that is nearly the same color as the hand are shown in the input camera image 500.

The user designates extraction colors, which are colors of the object to be extracted, while viewing the camera image 500 presented on a user interface. For example, the user designates a region 550, which is part of the region of the hand 510, by using an input device (e.g., mouse) to move a mouse cursor from a position 530 to a position 540. In this case, the color information of the pixels included in the region 550 is registered as extraction colors.

Figure 5B:
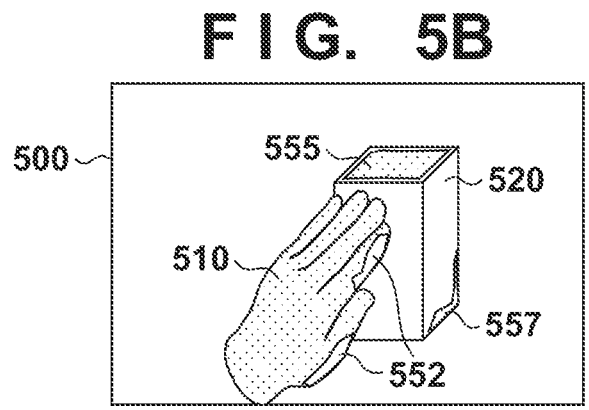
Figure 5C:
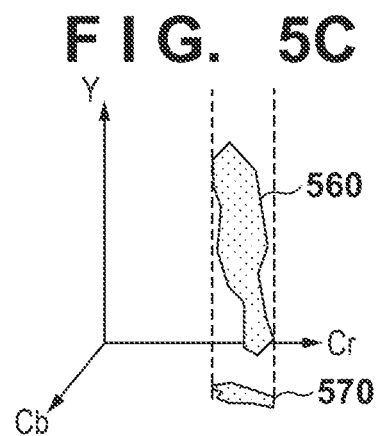

The information of the extraction colors can be mapped to the YCbCr space, as shown with an extraction color region 560 in FIG. 5C. Also, the extraction color region 560 may be projected onto the CbCr plane, in order to reduce the influence of brightness change (e.g., variation in brightness within an image and variation in brightness between frame images due to differences in lighting conditions, etc.). In this case, pixels having the colors included in an extraction color region 570 on the CbCr plane can be extracted as an object region from the camera image. An object region extracted from the camera image in accordance with the extraction color region 570 shown in FIG. 5C is shown in FIG. 5B. In FIG. 5B, regions 552 (unextracted regions) that were not extracted despite being inside the hand, and regions 555 and 557 (overextracted regions) erroneously extracted despite being background regions are shown.

Figure 5D:
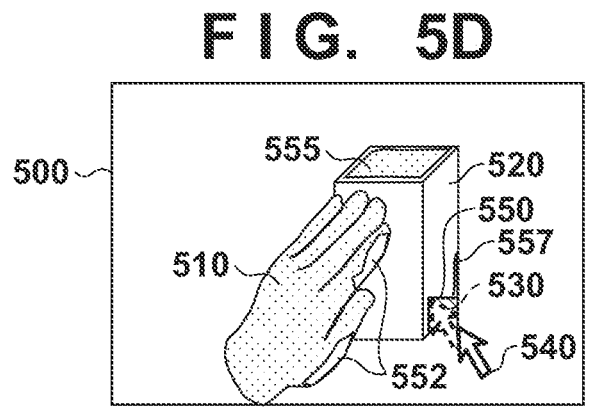

The user is able to further set non-extraction colors. For example, in order to ensure that the overextracted region 557 is not extracted, the user is able to designate a region 550 by dragging the mouse cursor from a position 530 to a position 540 on the camera image 500, as shown in FIG. 5D. In this case, the color information of the pixels included in the region 550 is registered as non-extraction colors. The information of the non-extraction colors can also be mapped to the YCbCr space and the CbCr plane, as shown with a non-extraction color region 565 and a non-extraction color region 575 in FIG. 5E. Here, the newly designated region can be prioritized, in the case where an extraction color region and a non-extraction color region overlap. For example, the non-extraction color region 575 can be prioritized, with regard to the region overlapping with the extraction color region 570 that was set previously.

Figure 5E:
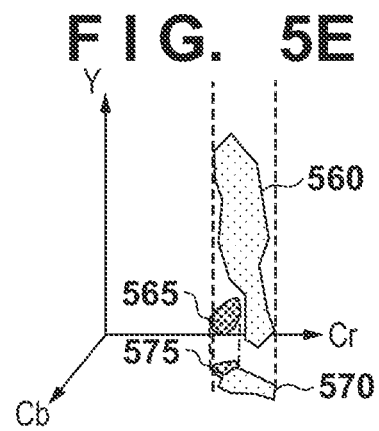
Figure 5F:
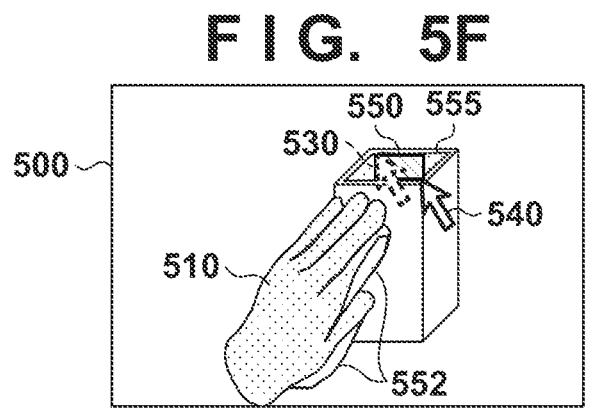
Figure 5G:
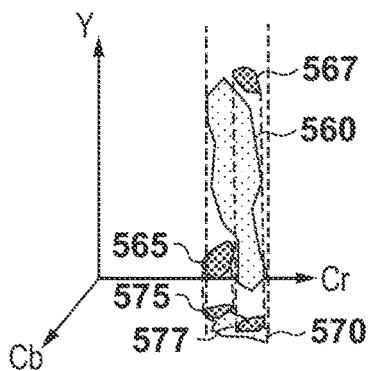
Figure 5H:
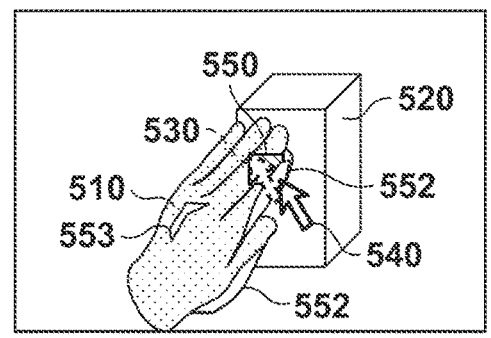

FIG. 5F shows the object region that is extracted from the camera image, in the case where the non-extraction color regions are set as shown in FIG. 5E. Here, even though the overextracted region 557 no longer exists, the extraction color region 570 has become smaller, resulting in the unextracted regions 552 becoming larger than in FIG. 5D. In order to ensure that the overextracted region 555 is not extracted, the user is able to further designate a region 550, as shown in FIG. 5F. The color information of the pixels included in the region 550 is also registered as non-extraction colors, as shown with a non-extraction color region 567 and a non-extraction color region 577 in FIG. 5G. FIG. 5H shows the object region that is extracted from the camera image, in the case where the non-extraction color regions are set as shown in FIG. 5G. Here, even though the overextracted region 555 no longer exists, the extraction color region 570 has become even smaller, resulting in a further unextracted region 553 occurring in a bright portion of the hand 510.

Figure 5I:
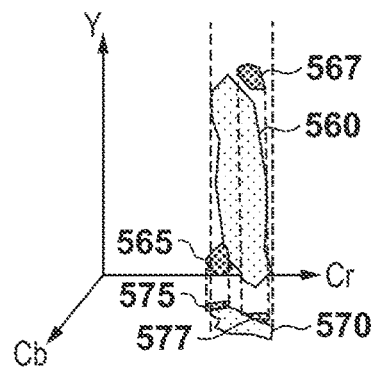
Figure 5J:
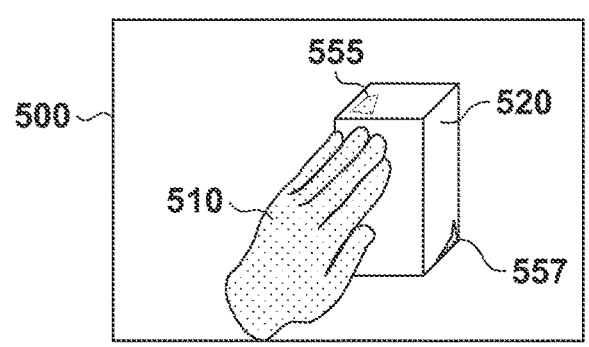

The user is able to further set extraction colors. For example, as shown in FIG. 5H, the user is able to designate a region 550 so as to be able to extract the unextracted regions 552 and 553. In this case, the color information of the pixels included in the region 550 is registered as extraction colors. The extraction color region 560 and the extraction color region 570 after registration are shown in FIG. 5I. Here, the extraction color region 570 added here is prioritized, with regard to the region overlapping with the non-extraction color region 575 that was set previously. FIG. 5J shows the object region that is extracted from the camera image, in the case where the non-extraction color regions are set as shown in FIG. 5I. In FIG. 5J, even though the unextracted regions 552 and 553 no longer exist, the non-extraction color region 575 has become smaller, resulting in the overextracted regions 555 and 557 appearing again.

As described above, adjustment can be carried out manually such that overextracted regions and unextracted regions become smaller, by repeatedly setting extraction colors and non-extraction colors, although this adjustment requires much time. Also, in the case of processing a moving image, adjustment is computed such that overextracted regions and unextracted regions become smaller using respective frames of the moving image, and further time is needed in this case.

According to the image processing apparatus of the present embodiment, object extraction is performed after performing color conversion on the image such that overextracted regions and unextracted regions become smaller. Thus, since the accuracy of object extraction from an image improves, it is expected that the number of times that setting is repeated will decrease, and the adjustment time will become shorter. It is expected that shortening of the adjustment time will also be achieved when such color conversion is computed automatically. Furthermore, according to the embodiment that will be described hereinafter, the user is able to designate overextracted regions and unextracted regions while performing checking on a user interface, and thus it is expected that adjustment time will become shorter.

Apparatus Configuration

Figure 1:
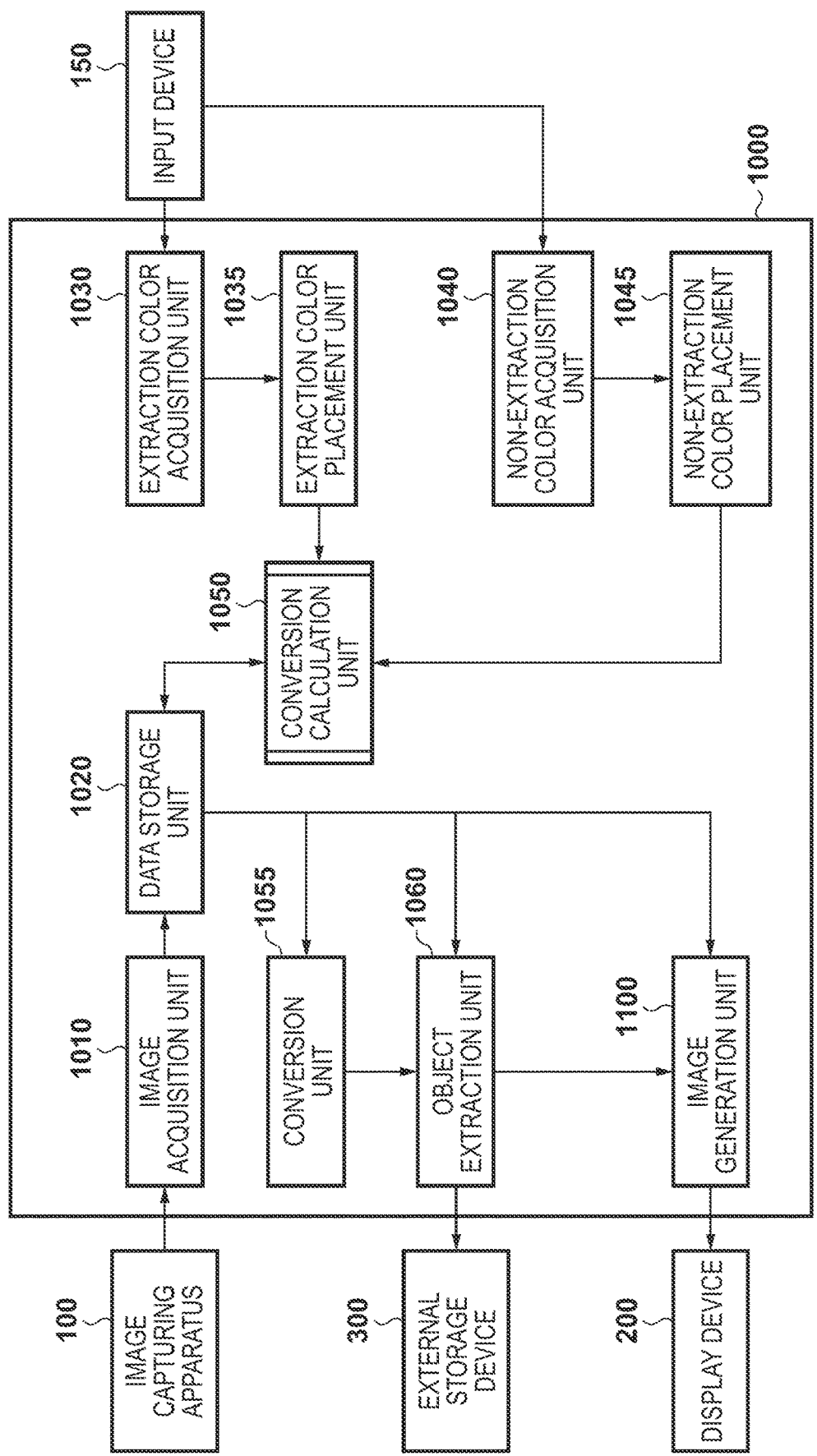
FIG. 1 is a block diagram showing an exemplary functional configuration of an image processing apparatus according to one embodiment.

FIG. 1 is a block diagram showing a functional configuration of an object extraction processing apparatus, which is an image processing apparatus according to the present embodiment. A processing apparatus 1000 extracts an object region from an image. An image capturing apparatus 100, a display device 200, an external storage device 300, and an input device 150 can be connected to the processing apparatus 1000.

The image capturing apparatus 100 is able to capture images including an object, and is, for example, a camera that captures color images. The display device 200 is able to display information such as images and the like. The processing apparatus 1000 may be capable of controlling the connected image capturing apparatus 100.

The result of compositing information indicating an object extraction result with live action video can be fed back to the user, using the display device 200. The display device 200 may be a display, and is, for example, a head-mounted display or a stationary large-scale monitor.

The input device 150 is a device that is used for inputting an instruction to the processing apparatus 1000. The user is able to control object extraction processing, by using the input device 150. In the present embodiment, the input device 150 is a mouse. The user is able to adjust the object region, by designating noise regions, such as regions of the object that were not determined to be the object and regions outside the object that were determined to be the object, with the input device 150, while viewing the results displayed on the display device 200.

The external storage device 300 is able to store data and programs. For example, the external storage device 300 is able to save information indicating the object region of a camera image determined by the processing apparatus 1000. The external storage devices 300 may be a memory, a hard disk or the like, for example, and can be used as a transitory storage medium for transmitting such information to another program.

An image acquisition unit 1010 provided in the processing apparatus 1000 acquires images. The image acquisition unit 1010 is able to acquire camera images from the image capturing apparatus 100, and store the acquired camera images in a data storage unit 1020.

The data storage unit 1020 provided in the processing apparatus 1000 is able to store camera images input from the image acquisition unit 1010. Also, the data storage unit 1020 is able to store color information and color conversion parameters that are used in object extraction. An example of color information (e.g., converted extraction color table and converted non-extraction color table described later) and an example of color conversion parameters will be described later. The type of data that is held by the data storage unit 1020 is not limited thereto, and the data storage unit 1020 is able to hold any type of information that can be used for color space conversion.

An extraction color acquisition unit 1030 and a non-extraction color acquisition unit 1040 provided in the processing apparatus 1000 acquire designation of one or more extraction colors belonging to the object region of an image and designation of one or more non-extraction colors that do not belong to the object region of the image (designation acquisition). Hereinafter, the configurations of these units will be described in greater detail.

The extraction color acquisition unit 1030 acquires designation of extraction colors, which are colors of the object that are to be extracted. For example, the extraction color acquisition unit 1030 may be a module that acquires color information for each pixel included in a region (first region) of the object designated in the camera image by the user as a designated extraction color. For example, the user is able to designate a region of the object, by carrying out a drag operation of the mouse, which is the input device 150. In this case, the extraction color acquisition unit 1030 is able to acquire color information of the designated region with reference to the camera image. In the present embodiment, values in the YCbCr color space (three values of Y, Cb and Cr) are used as color information. Of course, it is not essential to use representations of color in the YCbCr space in the present invention. In one embodiment, color information of three dimensions or more including first color values (e.g., Y values) representing brightness and second color values (e.g., Cb and Cr values) representing chromaticity in a color space in which brightness information and chromaticity information are separable is used. The extraction color acquisition unit 1030 is able to acquire color information thus obtained as designation of extraction colors.

Figures 2, 3A, 3B, 4A, 4B:
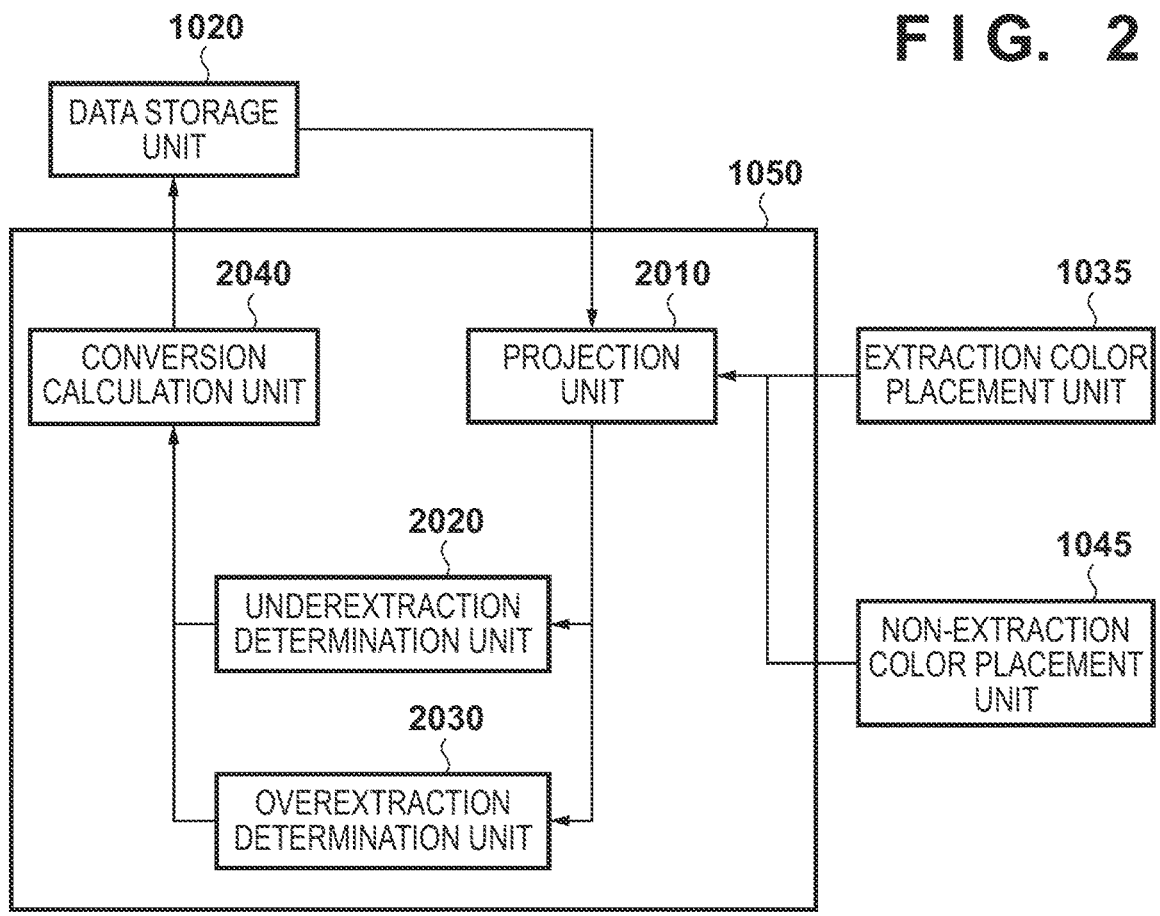
FIG. 2 is a block diagram showing an exemplary functional configuration of a conversion calculation unit 1050 according to one embodiment.
FIGS. 3A and 3B illustrate an extraction color table and a non-extraction color table.
FIGS. 4A and 4B illustrate a converted extraction color table and a converted non-extraction color table.

An extraction color placement unit 1035 places color information input from the extraction color acquisition unit 1030 in an extraction color table. The extraction color placement unit 1035 is able to count the number of times that the same color information is input. For example, the extraction color placement unit 1035 is able to increase the count value corresponding to color information, in the case where the input color information overlaps with color information that is already registered. One example of this table is shown in FIG. 3A. In FIG. 3A, color information registered as extraction colors and the count value thereof are registered. This count value is the number of times that associated color information was designated by the user as an extraction color. This may be the number of times that a pixel having associated color information is designated as a pixel of an extraction color by the user. The user may designate the same pixel as a pixel of an extraction color two or more times. The extraction color placement unit 1035 outputs the table thus generated to a conversion calculation unit 1050.

The non-extraction color acquisition unit 1040 provided in the processing apparatus 1000 acquires designation of non-extraction colors, which are colors that are not to be extracted (colors outside the object). For example, the non-extraction color acquisition unit 1040 may be a module that acquires the color information of each pixel included in a region (second region) other than the object designated in the camera image by the user as a designated non-extraction color. Similarly to the extraction color acquisition unit 1030, the user is able to designate a region other than the object, by carrying out drag operation of the mouse, which is the input device 150. The user is thus able to designate overextracted regions (noise).

A non-extraction color placement unit 1045 provided in the processing apparatus 1000 places color information input from the non-extraction color acquisition unit 1040 in a non-extraction color table. The non-extraction color placement unit 1045 is able to count the number of times that the same color information is input, similarly to the extraction color placement unit 1035. One example of this table is shown in FIG. 3B. The color information registered as non-extraction colors and the count value thereof are also registered in FIG. 3B. The non-extraction color placement unit 1045 is able to output the table thus generated to the conversion calculation unit 1050.

Note that the method of recording extraction colors and non-extraction colors is not limited to a method that uses tables. For example, information indicating color regions in a color space that are registered as extraction colors or non-extraction colors can also be recorded. As a method of generating information indicating color regions from color information for a plurality of colors, closed convex hull processing described in Japanese Patent Laid-Open No. 2005-107967 is given as an example.

The conversion calculation unit 1050 provided in the processing apparatus 1000 derives color conversion parameters (hereinafter, also referred to as conversion information), based on the extraction colors and the non-extraction colors. For example, the conversion calculation unit 1050 may be a module for deriving color space conversion, using the extraction color table and the non-extraction color table. The conversion calculation unit 1050 is able to calculate conversion information of the color space, such that overextracted regions and unextracted regions are minimized in size, when object extraction has been performed. The conversion calculation unit 1050 then records the obtained color space conversion information and the converted extraction color table and converted non-extraction color table obtained through color space conversion of the respective color information of the extraction color table and the non-extraction color table to the data storage unit 1020.

In the present embodiment, color conversion that projects the color information of an image represented in a multi-dimensional color space onto a lower dimensional color space can be performed. That is, the colors after conversion that is based on color conversion parameters may be color information that is obtained by projecting the color information of an image represented in a multi-dimensional color space onto a lower dimensional color space. In one example in which the colors of an image are represented by color information in a three-dimensional color space, the colors after conversion can be represented by color information that is obtained by performing color space conversion on the colors of the image based on the color conversion parameters, and projecting the color information after color space conversion onto a coordinate plane.

For example, as conversion information of a color space, triaxial rotation values ($\theta x$, $\theta y$, $\theta z$) obtained by rotating a color space can be used. In the present embodiment, as one example, the Y, Cb and Cr values are converted into Y', Cb' and Cr' values by rotating the YCbCr color space to a Y'Cb'Cr' color space in accordance with the triaxial rotation values. In this way, the Cb' and Cr' values of color information obtained by projecting the color information after color space conversion onto a Cb'Cr' coordinate plane can be obtained, using the conversion information of the color space. As will be described later, extraction of an object region by the object extraction unit 1060 is performed using Cb' and Cr' values calculated in this way. Note that the Cb' and Cr' values correspond to values obtained by projecting the Y, Cb and Cr values onto an arbitrary plane in the YCbCr color space.

Note that the color space conversion is not limited to triaxial rotation, and any conversion that includes nonlinear conversion can be employed. For example, the color space conversion may be uniaxial or biaxial rotation. Also, the color space conversion may be conversion that partially improves the resolution of a color region of interest, by enlarging or reducing the scale only at a predetermined region. The configuration of the conversion calculation unit 1050 will be described in greater detail later.

A conversion unit 1055 performs color space conversion processing on the color information of a camera image, based on the conversion information of a color space that is stored in the data storage unit 1020. For example, the conversion unit 1055 is able to convert Y, Cb and Cr values into Y', Cb' and Cr' values after color space conversion for all the pixels of the camera image, by performing color space conversion that is based on triaxial rotation values included in the conversion information. The conversion unit 1055 outputs the camera image after color space conversion to an object extraction unit 1060.

The object extraction unit 1060 extracts an object region from an image based on the image after color conversion and the extraction colors. For example, the object extraction unit 1060 is able to extract an object region from the camera image after the color conversion output from the conversion unit 1055. Note that the object extraction unit 1060 is also able to extract an object region based further on non-extraction colors, as will be described later. The object extraction unit 1060 is able to output the extracted object region to the external storage device 300 or an image generation unit 1100.

The image generation unit 1100 generates information indicating the object region extracted by the object extraction unit 1060. The image generation unit 1100 is able to overlay information indicating an extracted object region on a camera image. For example, the image generation unit 1100 is able to generate a display image by coloring the object region extracted by the object extraction unit 1060, within the camera image saved in the data storage unit 1020. The image generation unit 1100 is able to perform display control for displaying the display image thus generated on the display device 200. Based on such a display image, the user is able to check for overextracted regions and unextracted regions produced in object extraction. FIG. 5B shows an example of such a display image. A similar user interface to FIG. 5B can also be employed in the case of performing color conversion such as in the present embodiment.

FIG. 2 is a block diagram showing a detailed configuration of the conversion calculation unit 1050. A projection unit 2010 performs projection conversion on the color information that is placed in the extraction color table acquired from the extraction color placement unit 1035, based on the conversion information of the color space acquired from the data storage unit 1020. Also, the projection unit 2010 similarly performs projection conversion on the color information that is placed in the non-extraction color table acquired from the non-extraction color placement unit 1045. In the projection conversion according to the present embodiment, rotation conversion that is based on the triaxial rotation values ($\theta x$, $\theta y$, $\theta z$) is performed on the color values (three-dimensional data) in the YCbCr space placed in the table, and the color values after conversion are projected onto a Cb'·Cr' plane. An example of the converted extraction color table and the converted non-extraction color table, obtained by performing projection conversion on the extraction color table and non-extraction color table shown in FIGS. 3A and 3B, are shown in FIGS. 4A and 4B.

An underextraction determination unit 2020 determines unextracted regions of the object that were not extracted by the object extraction unit 1060, within the object region to be extracted. The underextraction determination unit 2020 is able to determine unextracted regions, based on the converted extraction color table and the converted non-extraction color table. In the present embodiment, the underextraction determination unit 2020 calculates the number of pixels that were not extracted as the object (e.g., number of pixels of the unextracted regions 552 and 553 in FIG. 5H), among the pixels designated by the user in order to designate the extraction colors (e.g., pixels within the region 550 of FIG. 5A). The calculation method will be described in detail later.

An overextraction determination unit 2030 determines overextracted regions of the object that is extracted by the object extraction unit 1060, within regions other than the objects, i.e., within regions that are not to be extracted. The overextraction determination unit 2030 is able to determine overextracted regions, based on the converted extraction color table and the converted non-extraction color table. In the present embodiment, the overextraction determination unit 2030 calculates the number of pixels extracted as the object (e.g., number of pixels of the overextracted regions 555 and 557 in FIG. 5J), among the pixels designated by the user in order to designate non-extraction colors (e.g., pixels within the region 550 of FIGS. 5D and 5F). The calculation method will be described in detail later.

A conversion calculation unit 2040 derives color conversion parameters, based on the result of determining unextracted regions and overextracted regions by the underextraction determination unit 2020 and the overextraction determination unit 2030. The conversion calculation unit 2040 is able to calculate conversion information of the color space, such that unextracted regions and overextracted regions become smaller. The conversion calculation unit 2040 records the obtained conversion information to the data storage unit 1020.

Figure 9:
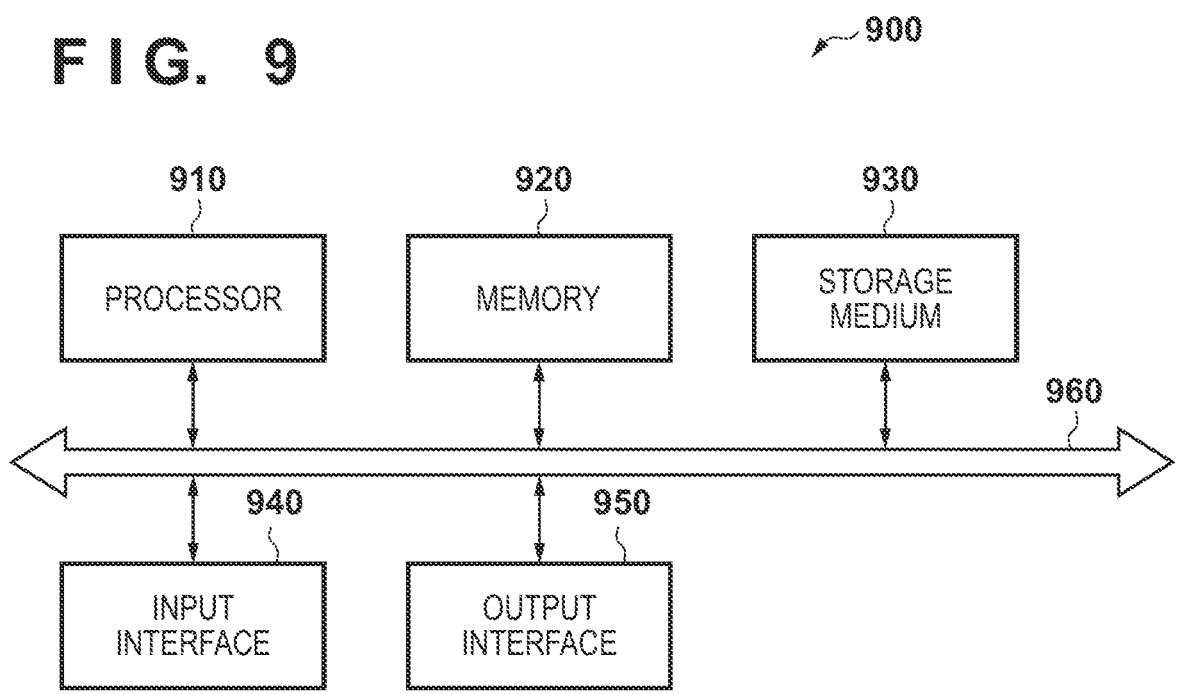
FIG. 9 is a block diagram showing an exemplary configuration of a computer that is used in one embodiment.

The various processing units described above, for example, shown in FIGS. 1 and 2, may be realized by dedicated hardware. On the other hand, some or all of the processing units that are included in the processing apparatus 1000 may be realized by a computer. FIG. 9 is a diagram showing one example of the basic configuration of a computer 900 that can be used. In FIG. 9, a processor 910 is a CPU, for example, and controls the operations of the entire computer. A memory 920 is a RAM, for example, and temporarily stores programs, data, and the like. A computer-readable storage medium 930 is a hard disk or a CD-ROM, for example, and provides long-term storage of programs, data, and the like. In the present embodiment, a program, stored in the storage medium 930, for realizing the functions of the various units is read out to the memory 920. The functions of the various units are then realized, by the processor 910 operating in accordance with the program in the memory 920. In FIG. 9, an input interface 940 is an interface for acquiring information from an external device. Also, an output interface 950 is an interface for outputting information to an external device. A bus 960 connects the abovementioned units and enables exchange of data.

Processing Procedure

Figure 7:
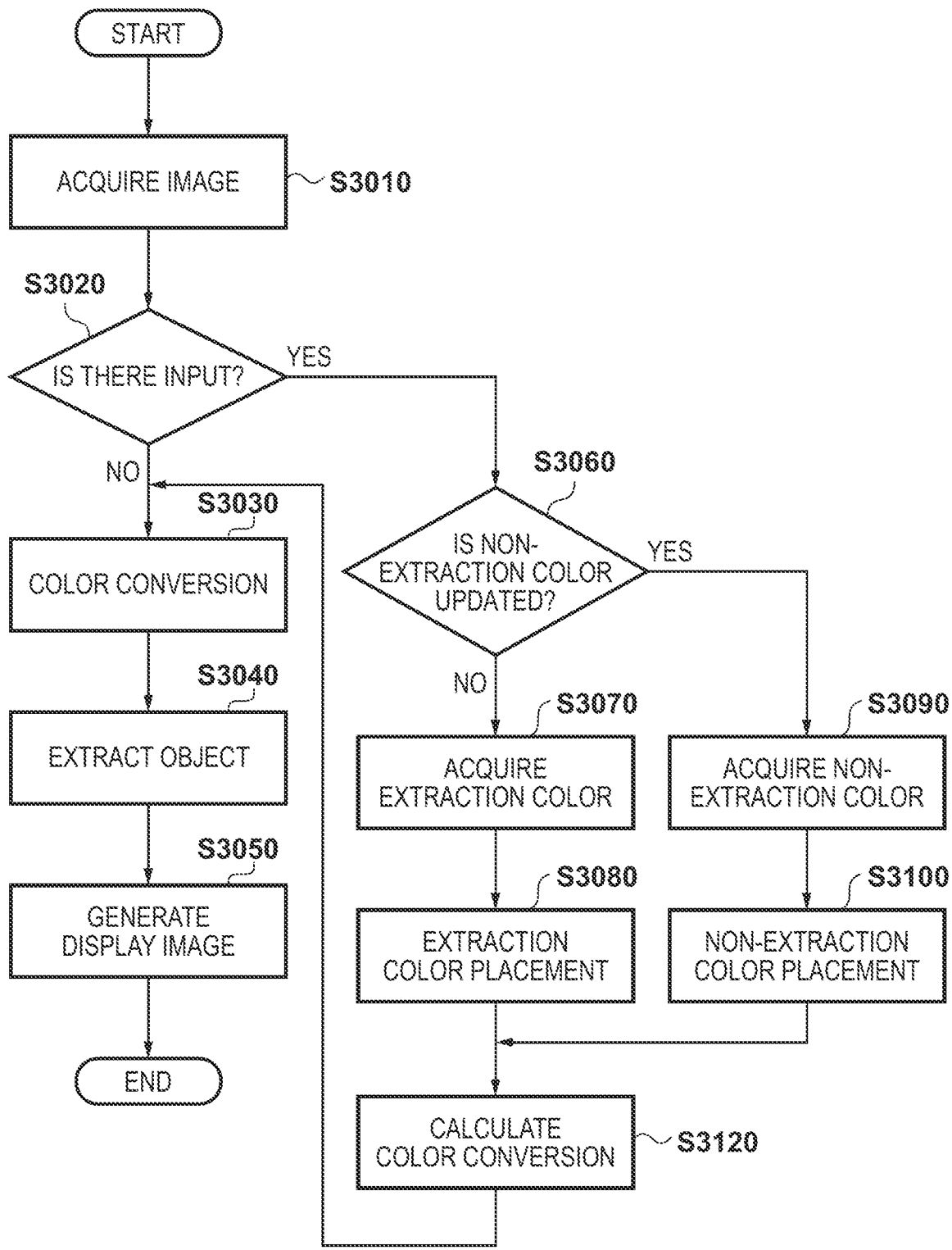
FIG. 7 is a flowchart of processing that is performed by the image processing apparatus according to one embodiment.

FIG. 7 is a flowchart showing one example of processing that is performed by the processing apparatus 1000 according to the present embodiment. The processing shown in FIG. 7 may be repeatedly executed whenever the camera image from the image capturing apparatus 100 is updated. For example, in the case where the image capturing apparatus 100 generates a moving image, the processing apparatus 1000 is able to perform the following processing on the respective frame images constituting the moving image.

In step S3010, the image acquisition unit 1010 acquires a camera image from the image capturing apparatus 100, and stores the acquired camera image in the data storage unit 1020.

In step S3020, the extraction color acquisition unit 1030 and the non-extraction color acquisition unit 1040 determine whether there is an input from the input device 150. In the case where there is an input, the processing transitions to step S3060. In the case where there is not an input, the processing transitions to step S3030.

In step S3030, the conversion unit 1055 performs color space conversion on the color information for each pixel of the camera image, based on the conversion information of the color space that is stored in the data storage unit 1020. In one embodiment, color space conversion can be performed using the following equation (1). In the equation (1), Y, Cb and Cr are the color values of the original camera image, R is a 3×3 rotation matrix based on the triaxial rotation values (θx, θy, θz), and Y', Cb' and Cr' are the color values after conversion.

$$\begin{bmatrix} Y' \\ Cb' \\ Cr' \end{bmatrix} = R \cdot \begin{bmatrix} Y \\ Cb \\ Cr \end{bmatrix} \quad (1)$$

In step S3040, the object extraction unit 1060 determines whether each pixel is included in the object region, based on the color values after conversion obtained in step S3030. Here, the object extraction unit 1060 is able to determine whether the pixel of interest is a pixel of the object region, based on whether the color of the pixel of interest of the image after conversion that is based on the color conversion parameters is an extraction color after conversion. Note that the color of the pixel of interest does not need to perfectly match an extraction color, and it may be determined that the color of the pixel of interest is an extraction color after conversion, in the case where the difference between the color of the pixel of interest and an extraction color is within a predeteimined threshold, for example. Similarly, as will be described later, when determining whether an extraction color and a non-extraction color are the same, and also when determining whether two or more extraction colors or non-extraction colors are the same, the colors do not need to match perfectly.

For example, the object extraction unit 1060 is able to perform this determination based on the converted extraction color table that is stored in the data storage unit 1020. In the present embodiment, the object extraction unit 1060 is able to register the pixel of interest as a pixel of the object region, in the case where the Cb' and Cr' values of the pixel of interest obtained in step S3030 corresponds to Cb' and Cr' values of the converted extraction color table. The object extraction unit 1060 does not register the pixel of interest as a pixel of the object region, in the case where the Cb' and Cr' values of the pixel of interest does not correspond to Cb' and Cr' values of the converted extraction color table. In the present embodiment, the object extraction unit 1060 performs determination on each pixel of the camera image, as to whether the pixel belongs to the object. The object extraction unit 1060 then outputs the coordinates of the pixels of the object region to the external storage device 300 or the image generation unit 1100.

In step S3050, the image generation unit 1100 performs compositing processing on the camera image stored in the data storage unit 1020 to composite information indicating the object region extracted in step S3040. For example, the image generation unit 1100 is able to color the object region of the camera image. By thus displaying the composite image obtained on the display device 200, the user is able to know the degree of matching (for example, size of unextracted regions and overextracted regions) between the region of the hand 510, which is the object, and the extracted object region. The image generation unit 1100 is able to composite a semi-transparent graphic indicating the object region with the camera image, such that comparison between the outline of the hand 510 in the camera image and the outline of the object region is facilitated.

In step S3060, the extraction color acquisition unit 1030 and the non-extraction color acquisition unit 1040 determine whether input from the input device 150 was input of an extraction color or input of a non-extraction color. In a case of input of a non-extraction color, the processing moves to step S3090. Also, in a case of input of an extraction color, the processing moves to step S3070. Note that if there are a plurality of inputs, the processing of steps S3060 to S3100 can be performed for each input.

In step S3070, the extraction color acquisition unit 1030 acquires the color information of the camera image in the region designated using the input device 150, and outputs the acquired color information to the extraction color placement unit 1035. For example, a rectangular region defined by vertices with start coordinates and end coordinates can be designated by a mouse drag operation using the input device 150. The region 550 is designated in the example of FIG. 5A, and the extraction color acquisition unit 1030 in this case acquires the color information for each pixel included in the region 550. In the case where there are pixels having the same color information, the extraction color acquisition unit 1030 counts and outputs the number of pixels that have this color information.

In step S3080, the extraction color placement unit 1035 updates the extraction color table using the color information acquired in step S3070. In the example of FIG. 5A, the extraction color placement unit 1035 adds the color information for the pixels included in the region 550 to the extraction color table. At this time, the extraction color placement unit 1035 also stores the number of pixels having the same color information in association with the color information. FIG. 5C shows the extraction colors registered in the example of FIG. 5A as the three-dimensional extraction color region 560.

In step S3090, the non-extraction color acquisition unit 1040 acquires the color information and of the camera image in the region designated using the input device 150 and the number of pixels having the same color information, and outputs the acquired color information and number of pixels to the non-extraction color placement unit 1045. The specific technique is similar to step S3070. The region 550 is designated in the example of FIG. 5D, and the non-extraction color acquisition unit 1040 in this case acquires the color information for each pixel included in the region 550.

In step S3100, the non-extraction color placement unit 1045 updates the non-extraction color table using the color information acquired in step S3090. The specific technique is similar to step S3090. FIG. 5E shows the non-extraction colors registered in the example of FIG. 5D as the three-dimensional non-extraction color region 565.

In step S3120, the conversion calculation unit 1050 calculates the conversion information of the color space based on the extraction color table and the non-extraction color table. The conversion calculation unit 1050 is able to calculate the conversion information, such that overextracted regions and unextracted regions are minimized in size at the time of object extraction. Also, the conversion calculation unit 1050 creates the converted extraction color table and the converted non-extraction color table, by performing color conversion of the color information included in the extraction color table and the non-extraction color table, in accordance with the conversion information. The conversion calculation unit 1050 records the conversion information, converted extraction color table and converted non-extraction color table thus obtained to the data storage unit 1020. Thereafter, the processing moves to S3030. The specific processing by the conversion calculation unit 1050 will be described later.

Figure 6:
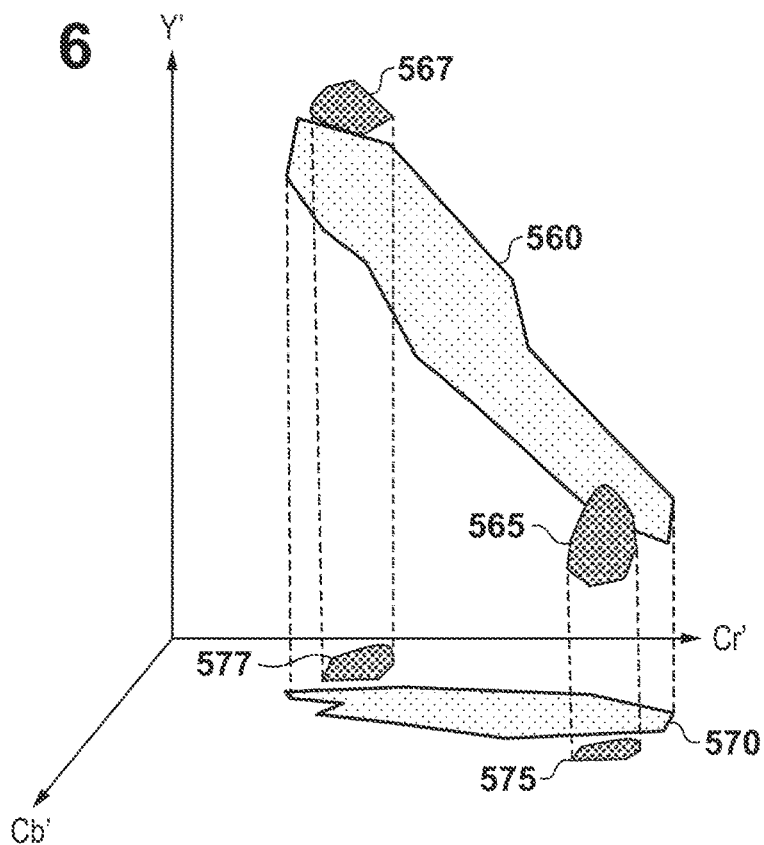
FIG. 6 is a schematic diagram showing extraction color regions and non-extraction color regions after performing color space conversion.

In the example shown in FIG. 5G, the extraction color region 560 and the non-extraction color regions 565 and 567 are registered in the Y-Cb-Cr color space. The extraction color region 560 and the non-extraction color regions 565 and 567 partially overlap, when projected onto the CbCr plane. Pixels having the color information included in such an overlapping portion when projected onto the CbCr plane may constitute an unextracted region or an overextracted region. In the present embodiment, by performing rotation conversion on the color information as shown in FIG. 6, the color space is converted such that overextracted regions and unextracted regions decrease in number. In the example of FIG. 6, the extraction color region 570 projected onto the Cb'·Cr' plane as a result of rotation conversion being performed on the extraction color region 560 and the non-extraction color regions 565 and 567 does not overlap with the non-extraction color regions 575 and 577. Thus, the occurrence of unextracted regions and overextracted regions is suppressed, and it becomes possible to extract the object with even less noise.

After step S3050, the processing of steps S3020 to S3050 may be repeated. For example, after the object extraction unit 1060 has extracted the object region in step S3040, the processing may return to step S3020 and the extraction color acquisition unit 1030 and the non-extraction color acquisition unit 1040 may additionally acquire designation of extraction colors or non-extraction colors. In this case, in step S3120, the conversion calculation unit 1050 is able to update the color conversion parameters based on designation of the additionally acquired extraction colors or non-extraction colors. Also, in step S3040, the object extraction unit 1060 is able to extract the object region based on the color conversion parameters after updating. According to such a configuration, the user is able to repeatedly designate extraction colors or non-extraction colors while viewing the extraction result in the display image, and thus it is expected that the time taken for adjustment will decrease.

Figure 8:
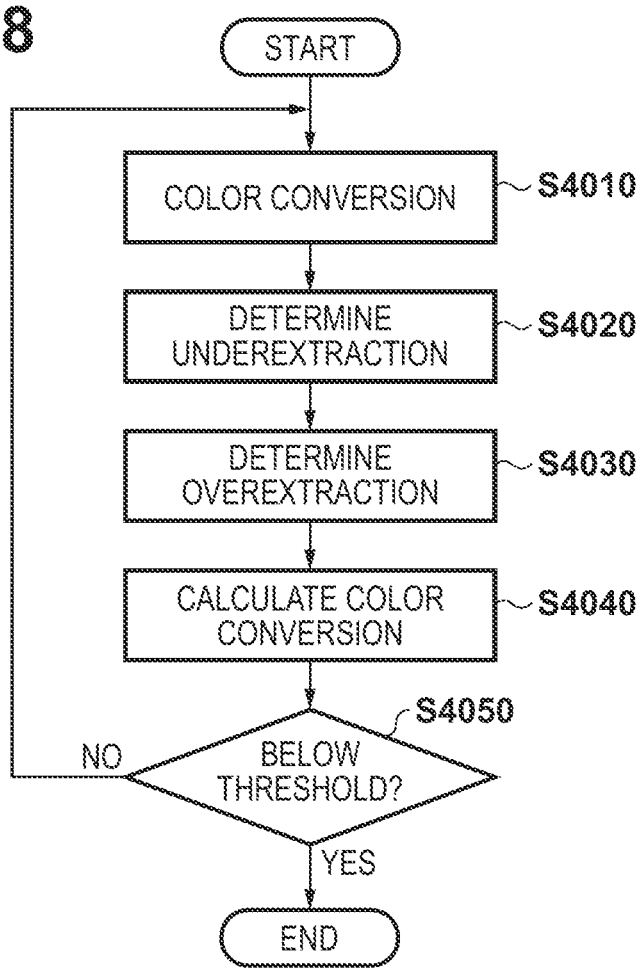
FIG. 8 is a flowchart showing details of color conversion calculation processing according to one embodiment.

FIG. 8 is a flowchart showing one example of calculation processing for color space conversion in step S3120 in detail. In step S4010, the projection unit 2010 converts the color information included in the extraction color table (FIG. 3A) and the non-extraction color table (FIG. 3B), using the conversion information of the color space acquired from the data storage unit 1020. Note that in an initial state (e.g., immediately after the program is started), any initial values can be used as conversion information. As one example, the initial values of the triaxial rotation values, which are conversion information, may be (0, 0, 0), in an initial state. Also, in the case of repeating the processing of step S3120 on the same camera image, the projection unit 2010 is able to acquire the conversion information calculated in the latest step S3120 from the data storage unit 1020. Furthermore, in the case of the processing of the step S3120 being performed on one camera image the first time, the projection unit 2010 is able to acquire the conversion information calculated for a camera image processed previously from the data storage unit 1020.

In the present embodiment, the projection unit 2010 calculates a 3×3 rotation matrix R for converting the color space from the conversion information of the color space. The projection unit 2010 then converts the Y, Cb and Cr values that are registered in the extraction color table updated by the extraction color placement unit 1035 into Y', Cb' and Cr' values, using an equation (1). Here, the count values corresponding to the original Y, Cb and Cr values are also associated with the Y', Cb' and Cr' values after conversion. Furthermore, the projection unit 2010 creates a converted extraction color table in which Cb' and Cr' values obtained by degenerating the Y', Cb' and Cr' values into the Cb'·Cr' plane are registered. In the converted extraction color table, the sum of the count values for color information having the same Cb' and Cr' values and various Y' values are associated with the Cb' and Cr' values. Thus, the appearance frequency of extraction colors in the Cb'·Cr' plane can be referenced, using the converted extraction color table. For example, the color information after conversion registered as extraction colors and the count value thereof are registered in the converted extraction color table shown in FIG. 4A. In this way, the projection unit 2010 is able to count, for each of the one or more extraction colors after the conversion based on the color conversion parameters, the number (first number) of pixels having an extraction color among the pixels designated by the user in order to designate the extraction colors (pixels included in the first region).

The projection unit 2010 similarly generates the converted non-extraction color table from the non-extraction color table updated by the extraction color placement unit 1035. The Cb' and Cr' values of the non-extraction colors and the appearance frequency thereof are registered in the converted non-extraction color table. For example, the color information after conversion registered as non-extraction colors and the count value thereof are registered in the converted extraction color table shown in FIG. 4B. In this way, the projection unit 2010 is able to count, for each of the one or more non-extraction colors after the conversion that is based on the color conversion parameters, the number (second number) of pixels having an extraction color among the pixels designated by the user in order to designate the non-extraction colors (pixels included in the second region).

In step S4020, the underextraction determination unit 2020 determines the existence of unextracted regions, based on the converted extraction color table and the converted non-extraction color table. In the present embodiment, the underextraction determination unit 2020 compares the count values of the converted extraction color table and the converted non-extraction color table for the same colors (Cb' and Cr'). The underextraction determination unit 2020 then judges that there is an unextracted region having these colors (Cb' and Cr), in the case where there the count value of the converted extraction color table is less than the count value of the converted non-extraction color table. In this case, the number of pixels that the user designated with the intention of not registering is greater than the number of pixels that the user designated with the intention of registering, among the pixels having these colors. In the present embodiment, pixels having such colors are not extracted as the object region, since there is statistically a high possibility that these pixels are outside the object region. However, in this case, pixels designated by the user as the object will be unextracted pixels within the object region. For example, an unextracted region can occur, when the non-extraction color region 575 overlaps with the extraction color region 570, as shown in FIG. 5G.

In the present embodiment, the underextraction determination unit 2020 registers information indicating "unextracted" in the "state" field associated with such color information, as shown in FIG. 4A, in the converted extraction color table. On the other hand, the underextraction determination unit 2020 registers information indicating "registered" in the "state" field associated with the remaining color information, in order to indicate that this color information can be used in object extraction.

In step S4030, the overextraction determination unit 2030 determines the existence of overextracted regions, based on the results of the converted extraction color table and the converted non-extraction color table. The overextraction determination unit 2030 performs similar comparison to the underextraction determination unit 2020, and, in the case where the count value of the converted extraction color table is greater than the count value of the converted non-extraction color table, judges that there is an overextracted region having the colors (Cb' and CO. In the present embodiment, pixels having such colors are extracted as the object region, since there is statistically a high possibility that these regions are within the object region. However, in this case, pixels designated by the user as not being the object will be overextracted pixels outside the object region. For example, an overextracted region can occur, when the extraction color region 570 overlaps with the non-extraction color region 577, as shown in FIG. 5I. In the present embodiment, the overextraction determination unit 2030 registers information indicating "overextracted" in the "state" field associated with such color information, as shown in FIG. 4B, in the converted non-extraction color table. On the other hand, the overextraction determination unit 2030 registers information indicating "not registered" in the "state" associated with the remaining color information, in order to indicate not to use this color information for object extraction. Note that, in the case where the count values match, it may be judged that an unextracted region exists, or it may be judged that an overextracted region exists.

In step S4040, the conversion calculation unit 2040 calculates the conversion information of the color space, such that unextracted regions determined in step S4020 and overextracted regions determined at step S4030 becomes smaller in the camera image.

In the following equation (2), Recall is a parameter defined so as to be 1 in the case where there are no unextracted regions. In equation (2), TP is the total value of the count values of respective color information included in the converted extraction color table. Also, FN is the total value of the count values of respective color information in which the state is "unextracted" in the converted extraction color table.

$$Recall = TP/(TP+FN) \qquad (2)$$

Also, in the following equation (3), Precision is a parameter defined so as to be 1 in the case where there are no overextracted regions. In equation (3), FP is the total value of the count values of respective color information in which the state is "overextracted" in the converted non-extraction color table.

$$Precision = TP/(TP+FP) \qquad (3)$$

The conversion calculation unit 2040 calculates the conversion information of the color space, based on a parameter F of the following equation (4), which is obtained by combining equation (2) and equation (3), and is defined so as to be 1 in the case where there are no unextracted regions or overextracted regions.

$$F=(2\cdot\text{Recall}\cdot\text{Precision})/(\text{Recall}+\text{Precision}) \qquad (4)$$

The conversion calculation unit 2040, first, obtains the F value in accordance with equation (4) using the parameters (Ox, Oy, Oz) which is the conversion information acquired in step S4010. The conversion calculation unit 2040 then changes the parameters (Ox, 9y, Oz), such that the F value is maximized. For example, the conversion calculation unit 2040 is able to perform an optimization calculation that computes the triaxial rotation values (Ox, Oy, Oz) in which the F value is a maximum using the least squares method.

In this way, the conversion calculation unit 2040 derives the color conversion parameters based on the determination result of pixels (unextracted region) that have extraction colors but are not extracted as the object region and pixels (overextracted region) that have non-extraction colors but are extracted as the object region. More specifically, the conversion calculation unit 2040 derives the color conversion parameters, such that unextracted regions and non-extraction regions are minimized in number. From another viewpoint, the conversion calculation unit 2040 derives the color conversion parameters based on the result of determining the degree of overlap between the extraction colors after conversion based on the color conversion parameters as shown in the converted extraction color table the non-extraction colors after conversion that is based on the color conversion parameters as shown in the converted non-extraction color table. More specifically, the conversion calculation unit 2040 derives the color conversion parameters, such that the degree of overlap of the extraction colors and non-extraction colors after conversion is minimized.

In step S4050, the conversion calculation unit 2040 determines whether to repeat the optimization calculation. For example, the conversion calculation unit 2040 is able to update the triaxial rotation values (Ox, Oy, Oz) to new values, in the case where the difference of the F value calculated in the previous loop and the F value calculated in the current loop is greater than or equal to the threshold. Thereafter, the processing returns to step S4010. In the case where difference is less than the threshold, the conversion calculation unit 2040 is able to end the optimization calculation. In this case, the conversion calculation unit 2040 records the obtained triaxial rotation values to the data storage unit 1020 as conversion information of the color space. Extraction of an object is performed using the conversion information thus recorded. In this way, the conversion calculation unit 1050 is able to derive the color conversion parameters, by repeatedly updating the color conversion parameters.

FIG. 6 shows the result of converting the color space of FIG. 5G in accordance with the conversion information thus obtained. In the Cb'·Cr' plane of FIG. 6, the extraction color region 570 and the non-extraction color regions 575 and 577 do not overlap, and thus it becomes possible to separate the object and the background with minimum noise. In this way, extraction color regions and non-extraction color regions are separated so as to not overlap by converting the color space, thus enabling unextracted regions and overextracted regions to be reduced. In the example of FIG. 6, the overextracted regions 555 and 557 that remained as noise in FIG. 5J no longer exist, and it becomes possible to extract only the region of the object (hand 510).

On the other hand, there are cases where the extraction color region 570 and the non-extraction color regions 575 and 577 cannot be separated and overlap, even when color space conversion is performed. In the present embodiment, the object extraction unit 1060 is able to determine whether the pixel of interest is a pixel of the object region, based on whether the color of the pixel of interest of the image after conversion that is based on the color conversion parameters is a non-extraction color after conversion. In one example, the object extraction unit 1060 may determine that the pixel of interest is not a pixel of the object region, in the case where the color of the pixel of interest of the image after conversion that is based on the color conversion parameters is included in both the extraction colors after conversion and the non-extraction color after conversion.

On the other hand, in the present embodiment, the object extraction unit 1060 further refers to the "state" of the extraction colors registered in the converted extraction color table, in the case where the color of the pixel of interest of the image after conversion that is based on the color conversion parameters is included in both the extraction color after conversion and the non-extraction color after conversion. As described above, the extraction colors after conversion are determined to be in an "unextracted" state, in the case where the number of pixels (first number) designated by the user in order to designate the extraction colors and having the color of the pixel of interest after conversion is less than the number of pixels (second number) designated by the user in order to designate non-extraction colors. The object extraction unit 1060 is able to determine that pixels having colors registered as being in an "unextracted" state in the converted extraction color table are outside the object region. Note that, in one embodiment, the object extraction unit 1060 may determine that pixels having colors registered as being in an "overextracted" state in the converted non-extraction color table are within the object region. As described above, in the case where the first number is greater than the second number, the non-extraction colors after conversion are determined to be an "overextracted" state. In this way the object extraction unit 1060 is able to determine that the pixel of interest is included or is not included in the object region, based on such first and second numbers. Similarly, in this case, extraction color regions and non-extraction color regions are reduced and object extraction accuracy improves, since separation of unextracted regions and overextracted regions improves due to color space conversion.

According to processing of the present embodiment, object extraction accuracy improves, since color space conversion is performed such that overextracted regions and unextracted regions are reduced in object extraction processing. Also, color space conversion that improves extraction accuracy is computed automatically, by using a configuration that designates the object region and the region outside the object, especially, a configuration that designates where overextracted regions and unextracted regions have occurred. Thus, overextracted regions and unextracted regions can be reduced in a shorter time than was conventionally possible.

Variation 1

The initial parameters in step S4040 are not particularly limited. Also, in order to avoid localized solutions being obtained, and to obtain conversion information that is more suitable for object extraction, a plurality of sets of initial parameters can be used. For example, instead of using only (0, 0, 0) as initial values of the triaxial rotation values, a plurality of initial values can be selected from candidates such as (0.5, 0, 0), (1, 0, 0), (0, 0.5, 0), (0, 1, 0), (0, 0, 0.5), and (0, 0, 1). In this case, the optimization calculation can be performed using respective initial values, and parameters that maximize the F value can be selected. Also, in the case where conversion information has already been obtained, (θx+0.5, θy, θz), (θx+1, θy, θz), (θx, θy+0.5, θz), (θx, θy+1, θz), (θx, θy, θz+0.5), (θx, θy, θz+1) and the like can be used as initial values, in addition to the triaxial rotation values (θx, θy, θz) obtained previously. According to such a configuration, the number of repetitions in optimization can be reduced, and an optimal solution can be obtained with minimal processing load.

Variation 2

The method of calculating the conversion information of a color space by the conversion calculation unit 2040 is not limited to the abovementioned method. That is, the degree of overlap between the extraction colors after conversion based on the color conversion parameters and the non-extraction colors after conversion based on the color conversion parameters can be reduced, using another method of improving separation of the extraction color region 570 and the non-extraction color regions 575 and 577 after projection. For example, the conversion calculation unit 2040 is able to determine the distance between the extraction color regions in the color space after conversion based on the color conversion parameters and the non-extraction color regions in the color space after conversion based on the color conversion parameters. The conversion calculation unit 2040 is then able to derive the color conversion parameters, by repeatedly updating the color conversion parameters, such that this distance is minimized.

As a specific example, conversion information may be computed, such that the distance between the outline of the extraction color region 570 and the outline of the non-extraction color regions 575 and 577 on the Cb'·Cr' plane, which is a projection surface, is maximized. For example, the shortest distance to outline points of non-extraction color regions at respective points of the sequence of outline points of extraction color regions on the Cb'·Cr' plane can be computed. The conversion information of the color space can then be optimized, such that the average value of the shortest distance computed for each point of the sequence of outline points of extraction color regions is maximized. Similarly, with such a method, conversion information that improves separation of the extraction color region 570 and the non-extraction color regions 575 and 577 and improves object extraction accuracy can be obtained. In particular, according to such a method, an optimal solution can be obtained with a calculation amount involving fewer repetitions, even in the case where extraction color are additionally registered based on another camera image.

Variation 3

It is not essential to provide all of the abovementioned constituent elements in the present invention. For example, an image processing apparatus according to one embodiment has a conversion calculation unit 1050 that derives color conversion parameters based on extraction colors and non-extraction colors. Also, this image processing apparatus has an object extraction unit 1060 that extracts the object region from an image, based on the image and extraction colors after conversion that is based on the color conversion parameters. By having such a configuration, it becomes possible to perform color conversion such that extraction colors, which are colors of the object, can be distinguished from non-extraction colors, which are colors not of the object, thus enabling the extraction accuracy of the object to be improved.

Also, the image processing apparatus according to one embodiment has an image acquisition unit 1010 that acquires an image in which each pixel is represented by color information of three dimensions or more including a first color value (e.g., Y value) representing brightness and a second color value (e.g., Cb and Cr values) representing chromaticity. Also, this image processing apparatus has a conversion unit 1055 that lowers the dimension of the color information of an image (e.g., projects color values onto a projection surface other than the CbCr plane such that the Y value contributes to the projection result), so as to derive color information after conversion using both the first color value and the second color value. By having such a configuration, it becomes possible to reduce the contribution of color values representing brightness such that the influence of brightness change decreases, while taking color values representing brightness into consideration in object extraction, thus enabling the extraction accuracy of an object to be enhanced.

Also, the image processing apparatus according to one embodiment has an extraction color acquisition unit 1030 and a non-extraction color acquisition unit 1040 that acquire designation of one or more extraction colors belonging to the object region of the image and one or more non-extraction colors that do not belong to the object region of the image. This image processing apparatus has an object extraction unit 1060 that extracts the object region from an image, such that a region that does not have a non-extraction color within the object region that is extracted changes according to designation of the non-extraction colors. For example, the object region changes according to designation of non-extraction colors, even in regions other than pixel regions having non-extraction colors, which are explicitly excluded from the object region by designation of non-extraction colors. In this way, the extraction accuracy of an object can be improved, by a configuration that changes the range of colors that are extracted with consideration for the non-extraction colors (e.g., the color space is rotated with consideration for non-extraction colors as described above).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-178083, filed Sep. 21, 2018, which is hereby incorporated by reference herein in its entirety.

What is claimed is:

1. An image processing apparatus for extracting an object region from an image, the image processing apparatus comprising:
one or more memories storing instructions; and
one or more processors that implement the instructions to:
acquire an image;
acquire designation of one or more extraction colors that belong to the object region of the image and designation of one or more non-extraction colors that do not belong to the object region of the image;
derive a color conversion parameter, based on the one or more extraction colors and the one or more non-extraction colors;
convert a color of the image based on the color conversion parameter; and
extract the object region from the image, based on the image and the one or more extraction colors after the conversion.

2. The image processing apparatus according to claim 1, wherein the color after the conversion based on the color conversion parameter is represented by color information that corresponds to a projection result of color information of the image represented in a multi-dimensional color space onto a lower dimensional color space.

3. The image processing apparatus according to claim 1, wherein:
the color of the image is represented by color information in a three-dimensional color space, and
the color after the conversion is represented by color information that corresponds to a result of color space conversion of the color of the image based on the color conversion parameter and following projection of color information after the color space conversion onto a coordinate plane.

4. The image processing apparatus according to claim 1, wherein the one or more processors implement the instructions to:
determine an overextracted region that is outside the object and that is extracted as the object region and an unextracted region on the object that is not extracted as the object region; and
derive the color conversion parameter based on a result of the determination.

5. The image processing apparatus according to claim 1, wherein the one or more processors implement the instructions to repeatedly update the color conversion parameter, such that the number of pixels that have any of the one or more extraction colors and are not extracted as the object region and pixels that have any of the one or more non-extraction colors and are extracted as the object region gets smaller, to derive the color conversion parameter.

6. The image processing apparatus according to claim 1, wherein the one or more processors implement the instructions to:
determine a degree of overlap between the one or more extraction colors after the conversion based on the color conversion parameter and the one or more non-extraction colors after the conversion based on the color conversion parameter; and
derive the color conversion parameter based on a result of the determination.

7. The image processing apparatus according to claim 1, wherein the one or more processors implement the instructions to:
determine a distance between an extraction color region in a color space after the conversion based on the color conversion parameter and a non-extraction color region in the color space after the conversion based on the color conversion parameter; and
repeatedly update the color conversion parameter such that the distance gets shorter, to derive the color conversion parameter.

8. The image processing apparatus according to claim 1, wherein the one or more processors implement the instructions to determine, based on whether a color of a pixel of interest of the image after the conversion based on the color conversion parameter is any of the one or more extraction colors after the conversion, whether the pixel of interest is a pixel of the object region.

9. The image processing apparatus according to claim 8, wherein the one or more processors implement the instructions to determine, based on whether the color of the pixel of interest of the image after the conversion based on the color conversion parameter is any of the one or more non-extraction colors after the conversion, whether the pixel of interest is the pixel of the object region.

10. The image processing apparatus according to claim 1, wherein the one or more processors implement the instructions to:
acquire a color of a pixel, included in a first region designated in the image, as one of the one or more extraction colors that is designated; and
acquire a color of a pixel, included in a second region designated in the image, as one of the one or more non-extraction colors that is designated.

11. The image processing apparatus according to claim 10, wherein:
the one or more processors implement the instructions to, for each of the one or more extraction colors after the conversion based on the color conversion parameter, count a first number of pixels included in the first region having the one or more extraction colors, and, for each of the one or more non-extraction colors after the conversion based on the color conversion parameter, count a second number of pixels included in the second region having the one or more non-extraction colors, and
the pixel of interest is determined to be included or not included in the object region, based on the first number and the second number of pixels having the color of the pixel of interest, in response to determining that the color of the pixel of interest of the image after the conversion based on the color conversion parameter is included in both the one or more extraction colors after the conversion and the one or more non-extraction colors after the conversion.

12. The image processing apparatus according to claim 1, wherein the one or more processors implement the instructions to:

after the extraction of the object region, additionally acquire designation of the one or more extraction colors or the one or more non-extraction colors;

update the color conversion parameter based on the additionally acquired designation of the one or more extraction colors or the one or more non-extraction color; and extract the object region based on the color conversion parameter after the update.

13. The image processing apparatus according to claim 1, wherein the one or more processors implement the instructions to overlay information indicating the extracted object region on the image.

14. An image processing method for extracting an object region from an image, the method comprising:

acquiring an image;

acquiring designation of one or more extraction colors that belong to the object region of the image;

acquiring designation of one or more non-extraction colors that do not belong to the object region of the image;

deriving a color conversion parameter, based on the one or more extraction colors and the one or more non-extraction colors;

converting a color of the image based on the color conversion parameter; and extracting the object region from the image, based on the image and the one or more extraction colors after the conversion.

15. The image processing method according to claim 14, wherein the color after the conversion based on the color conversion parameter is represented by color information that corresponds to a projection result of color information of the image represented in a multi-dimensional color space onto a lower dimensional color space.

16. The image processing method according to claim 14, wherein:

the color of the image is represented by color information in a three-dimensional color space, and the color after the conversion is represented by color information that corresponds to a result of color space conversion of the color of the image based on the color conversion parameter and following projection of color information after the color space conversion onto a coordinate plane.

17. The image processing method according to claim 14, the method further comprising:

determining an overextracted region that is outside the object and that is extracted as the object region and an unextracted region on the object that is not extracted as the object region, wherein the color conversion parameter is derived based on the result of the determination.

18. A non-transitory computer-readable medium storing a program executable by a computer comprising a processor and a memory to execute a method comprising:

acquiring an image;

acquiring designation of one or more extraction colors that belong to the object region of the image;

acquiring designation of one or more non-extraction colors that do not belong to the object region of the image;

deriving a color conversion parameter, based on the one or more extraction colors and the one or more non-extraction colors;

converting a color of the image based on the color conversion parameter; and extracting the object region from the image, based on the image and the one or more extraction colors after the conversion.

* * * * *